United States Patent
Hidaka (10) Patent No.: US 8,649,732 B2
(45) Date of Patent: *Feb. 11, 2014

(54) RADIO TERMINAL AND RADIO COMMUNICATION METHOD

(75) Inventor: Hiroyuki Hidaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 172 days.

This patent is subject to a terminal disclaimer.

(21) Appl. No.: 12/680,547

(22) PCT Filed: Sep. 25, 2008

(86) PCT No.: PCT/JP2008/067346
§ 371 (c)(1),
(2), (4) Date: Jun. 8, 2010

(87) PCT Pub. No.: WO2009/041536
PCT Pub. Date: Apr. 2, 2009

(65) Prior Publication Data
US 2010/0261479 A1  Oct. 14, 2010

(30) Foreign Application Priority Data
Sep. 28, 2007  (JP) .................. 2007-256313

(51) Int. Cl.
*H04B 7/15* (2006.01)
(52) U.S. Cl.
USPC ........... 455/11.1; 455/445; 455/13.1; 455/16; 455/41.2; 455/522
(58) Field of Classification Search
USPC .............. 455/428, 435.2–453, 11.1–13.1, 16; 370/243–246, 315–334
See application file for complete search history.

(56) References Cited

U.S. PATENT DOCUMENTS

| | | | |
|---|---|---|---|
| 7,873,338 B2 * | 1/2011 | Visotsky et al. | 455/226.2 |
| 2007/0291679 A1 * | 12/2007 | Kawakami et al. | 370/328 |
| 2008/0267110 A1 * | 10/2008 | Cai et al. | 370/315 |
| 2010/0034148 A1 * | 2/2010 | Zhang et al. | 370/328 |
| 2010/0041414 A1 * | 2/2010 | Yahagi | 455/452.2 |

FOREIGN PATENT DOCUMENTS

| | | |
|---|---|---|
| JP | 2000-078147 | 3/2000 |
| JP | 2002-165277 | 6/2002 |
| JP | 2003-124876 | 4/2003 |
| JP | 2007-158655 | 6/2007 |
| KR | 10-2006-0058592 | 5/2006 |
| KR | 10-2006-0066011 | 6/2006 |
| WO | WO-2005/109764 | 11/2005 |

OTHER PUBLICATIONS

International Search Report for PCT/JP2008/067346, mailed on Nov. 18, 2008, 2 pages.

(Continued)

*Primary Examiner* — Dai A Phuong
(74) *Attorney, Agent, or Firm* — Duane Morris LLP (57) ABSTRACT

A radio terminal according to the present invention comprises a data amount determination unit (135) configured to determine whether or not a total amount of data to be transmitted in the communications between all radio terminals constituting a tree-structured network and a radio base station exceeds a transmissible data amount in a communication bandwidth assigned to the communications between the communication unit and the radio base station; and a message processor (132) configured to transmit an inquiry message to the lower-level radio terminal when the data amount determination unit determines that the total data amount exceeds the transmissible data amount, the inquiring message inquiring whether or not direct communications with the radio base station are possible.

9 Claims, 8 Drawing Sheets (56) References Cited

OTHER PUBLICATIONS

Notification of Reason(s) for Refusal for Japanese Patent Application No. 2007-256313, mailed Jan. 24, 2012, 8 pages (including English translation).

Takizawa et al., "Evaluation of Traffic Control Method for Multi-hop Access Route in Cognitive Wireless Networks," IPSJ SIG Technical Report, dated Nov. 17, 2006, ITS "Intelligent Transport Systems" 2006(120):193-200 (English abstract).

Notice of Preliminary Rejection (translation) for KR 10-2010-7006947, mailed Jun. 11, 2011, 8 pages.

* cited by examiner

RADIO TERMINAL AND RADIO COMMUNICATION METHOD

CROSS-REFERENCE TO RELATED APPLICATIONS

This is a U.S. National Phase Application of International Application No. PCT/JP2008/067346 filed Sep. 25, 2008, which claims priority to Japanese Patent Application No. 2007-256313 filed Sep. 28, 2007, the disclosures of which are incorporated herein by reference in their entirety.

TECHNICAL FIELD

The present invention relates to a radio terminal constituting a tree-structured network in which a radio terminal directly communicating with a radio base station is set to be a root radio terminal, and also to a radio communication method.

BACKGROUND ART

Conventionally, an ad-hoc network has been known which is a radio network autonomously constituted by multiple radio terminals having a relay function. Additionally, a method by which a radio terminal constituting the ad-hoc network communicates with a radio base station has been proposed (See Patent Document 1, for example). To be specific, the radio terminal communicates with the radio base station by way of another radio terminal.

More specifically, multiple radio terminals constitute a tree-structured network in which a radio terminal directly communicating with a radio base station is set to be a root radio terminal. Since a lower-level radio terminal communicates with the radio base station by way of an upper-level radio terminal, the lower-level radio terminal can communicate with the radio base station even when the lower-level radio terminal is outside of the radio wave reachable range of the radio base station.

Patent Document 1: Japanese Patent Application No. 2003-124876 (Pages 6-7, FIG. 7)

DISCLOSURE OF THE INVENTION

In the tree-structured network described above, the root radio terminal relays data transmitted in the communications between the lower-level radio terminal and the radio base station. Thus, when the number of the lower-level radio terminals increases, the total amount of data to be transmitted in the communications between the root radio terminal and the radio base station also increases.

In such a case, there is a problem that the total amount of data to be transmitted exceeds an allowable amount of a communication bandwidth (hereinafter referred to as a "bandwidth allowable amount") assigned to the communications between the root radio terminal and the radio base station, which causes data delay or data destruction at the root radio terminal.

There is another problem that when the communication bandwidth assigned to the communications between the root radio terminal and the radio base station narrows even with the fixed total amount of data to be transmitted, the total amount of data to be transmitted exceeds the bandwidth allowable amount, which thus causes data delay or data destruction at the root radio terminal.

Hence, the present invention has been made to solve the problems described above, and an object of the present invention is to provide a radio terminal and a radio communication method which can prevent data delay or data destruction even when the number of the lower-level radio terminals increases or a communication bandwidth assigned to the communications between the root radio terminal and the radio base station narrows in the tree-structured network.

In order to solve the aforementioned problem, the present invention includes the following characteristics. To being with, a first characteristic of the present invention is summarized as a radio terminal (radio terminal MS) constituting a tree-structured network (ad-hoc network AH) in which a radio terminal directly communicating with a radio base station is set to be a root, the radio terminal comprising: a communication unit (base station communication unit 110) configured to directly communicate with the radio base station; a communication relay unit (ad-hoc communication unit 120, communication relay unit 137) configured to relay communications between the radio base station and a lower-level radio terminal (slave) in the tree-structure network; a data amount determination unit (data amount determination unit 135) configured to determine whether or not a total amount of data to be transmitted in the communications between all radio terminals constituting the tree-structured network and the radio base station exceeds a transmissible data amount in a communication bandwidth assigned to the communications between the communication unit and the radio base station; and an inquiry message transmitter (message processor 132) configured to transmit an inquiry message (search instruction) to the lower-level radio terminal when the data amount determination unit determines that the total data amount exceeds the transmissible data amount, the inquiring message inquiring whether or not direct communications with the radio base station are possible.

According to the aspect, the radio terminal directly communicating with the radio base station transmits to the lower-level radio terminal the inquiry message for inquiring whether or not direct communications with the radio base station is possible, when the total amount of data to be transmitted in the communications between all the radio terminals constituting the tree-structured network and the radio base station exceeds the transmissible amount of data in the communication bandwidth assigned to the communications between the communication unit (base station communication unit 110) and the radio base station.

Accordingly, it is possible to provide a radio terminal which can prevent delay or destruction of transmission data even when the number of the lower-level radio terminals increases or a communication bandwidth assigned to the communications between the root radio terminal and a radio base station narrows in a tree-structured network.

A second characteristic of the present invention is summarized as the radio communication terminal according to the first characteristic, further comprising an instruction message transmitter (message processor 132) configured to transmit an instruction message (connection instruction) to the lower-level radio terminal when a response message (search succeed) indicating that direct communications with the radio base station are possible is received from the lower-level radio terminal, the instruction message instructing the lower-level radio terminal to start direct communications with the radio base station.

A third characteristic of the present invention is summarized as the radio communication terminal according to the first characteristic, further comprising: a transmission data generator (application processor 136) configured to generate transmission data (application data) to be transmitted to the radio base station; and a transmission buffer unit (buffer unit 134) configured to hold relay data to be relayed by the communication relay unit from the lower-level radio terminal to the radio base station and the transmission data generated by the transmission data generator, until transmission to the radio base station completes, wherein the data amount determination unit determines that the total amount of data exceeds the transmissible data amount, when the data amount of the relay data and the transmission data held in the transmission buffer unit exceeds a predetermined threshold (data amount threshold TH).

A fourth characteristic of the present invention is summarized as a radio terminal (radio terminal MS) constituting a tree-structured network (ad-hoc network AH) in which a radio terminal directly communicating with a radio base station (radio base station BS) is set to be a root, the radio terminal comprising: an inquiry message receiver (message processor 132) configured to receive from an upper-level radio terminal (master) in the tree-structured network an inquiry message for inquiring whether or not direct communications with the radio base station are possible; a communication determination unit (communication determination unit 131) configured to determine whether or not direct communications with the radio base station are possible, when the inquiry message receiver receives the inquiry message; a communication unit (base station communication unit 110) configured to perform direct communications with the radio base station, when the communication determination unit determines that direct communications with the radio base station are possible; and a connection termination unit (master-slave manager 133, communication controller 138) configured to terminate the connection with the upper-level radio terminal, when the communication determination unit determines that direct communications with the radio base station are possible.

According to the aforementioned aspects, the radio terminal determines whether or not direct communications with the radio base station is possible, when receiving from the high-level radio terminal the inquiry message for inquiring whether or not direct communications with the radio base station is possible. Then, when it is determined that direct communications with the radio base station is possible, the radio terminal performs direct communications with the radio base station and also terminates connection with the high-level radio terminal.

Therefore, even when the number of lower-level radio terminals increases or a communication bandwidth assigned to the communications between the root radio terminal and a radio base station narrows in a tree-structured network, among the lower-level radio terminals belonging to the tree-structured network, a radio terminal capable of directly communicating with the radio base station and its subordinate radio terminals are separated from the tree-structured network. Therefore, a total amount of data to be transmitted by the root radio terminal is reduced. Accordingly, a radio terminal which can prevent delay or destruction of transmission data can be provided.

A fifth characteristic of the present invention is summarized as the radio communication terminal according to the fourth characteristic, further comprising: a response message transmitter (message processor 132) configured to transmit to the upper-level radio terminal a response message (search succeed) indicating that direct communications with the radio base station are possible, when the communication determination unit determines that direct communications with the radio base station are possible; and an instruction message receiver (message processor 132) configured to receive from the upper-level radio terminal an instruction message (connection instruction) instructing to start direct communications with the radio base station, wherein the communication unit performs direct communications with the radio base station, when the communication determination unit determines that direct communications with the radio base station are possible and when the instruction message receiver receives the instruction message.

A sixth characteristic of the present invention is summarized as the radio communication terminal according to the fourth characteristic, further comprising an inquiry message transmitter (message transmitter 132) configured to transmit the inquiry message to a lower-level radio terminal in the tree-structured network, when the communication determination unit determines that direct communications with the radio base station are not possible.

A seventh characteristic of the present invention is summarized as a radio communication method to be used in a radio terminal constituting a tree-structured network in which a radio terminal directly communicating with a radio base station is set be a root, the radio communication method comprising the steps of: directly communicating with the radio base station; relaying communications between the radio base station and a lower-level radio terminal in the tree-structured network; determining whether or not a total amount of data to be transmitted in the communications between all radio terminals constituting the tree-structured network and the radio base station exceeds a transmissible data amount in a communication bandwidth assigned to the communications between the communication unit and the radio base station; and transmitting an inquiry message to the lower-level radio terminal when it is determined in the determining step that the total amount of data exceeds the transmissible data amount, the inquiry message inquiring whether or not direct communications with the radio base station are possible.

A eighth characteristic of the present invention is summarized as a radio communication method to be used in a radio terminal constituting a tree-structured network in which a radio terminal directly communicating with a radio base station is at the root, the radio communication method comprising the steps of: receiving an inquiry message from an upper-level radio terminal in the tree-structured network, the inquiry message inquiring whether or not direct communications with the radio base station are possible; determining whether or not direct communications with the radio base station are possible, when the inquiry message is received in the receiving step; performing direct communications with the radio base station when it is determined in the determining step that direct communications with the radio base station are possible; and terminating the connection with the upper-level radio terminal, when it is determined in the determining step that direct communications with the radio base station are possible.

According to the present invention, it is possible to provide a radio terminal and a radio communication method that can prevent data delay or data destruction even when the number of lower-level radio terminals increases or a communication bandwidth to be assigned to the communications between the root radio terminal and a radio base station narrows in a tree-structured network.

BEST MODE FOR CARRYING OUT THE INVENTION

Embodiments of the present invention will be described hereinafter with reference to the drawings. In the following description of the drawings in the embodiments, a same or similar reference numeral is given to a same or similar part.

In the following, descriptions will be given of (1) Overall Schematic Configuration of Radio Communication System, (2) Overall Schematic Operation of Radio Communication System, (3) Configuration of Radio Terminals, (4) Detailed Operation of Radio Communication System, (5) Operation and Effect, and (6) Other Embodiments.

(1) Overall Schematic Configuration of Radio Communication System

Figure 1:
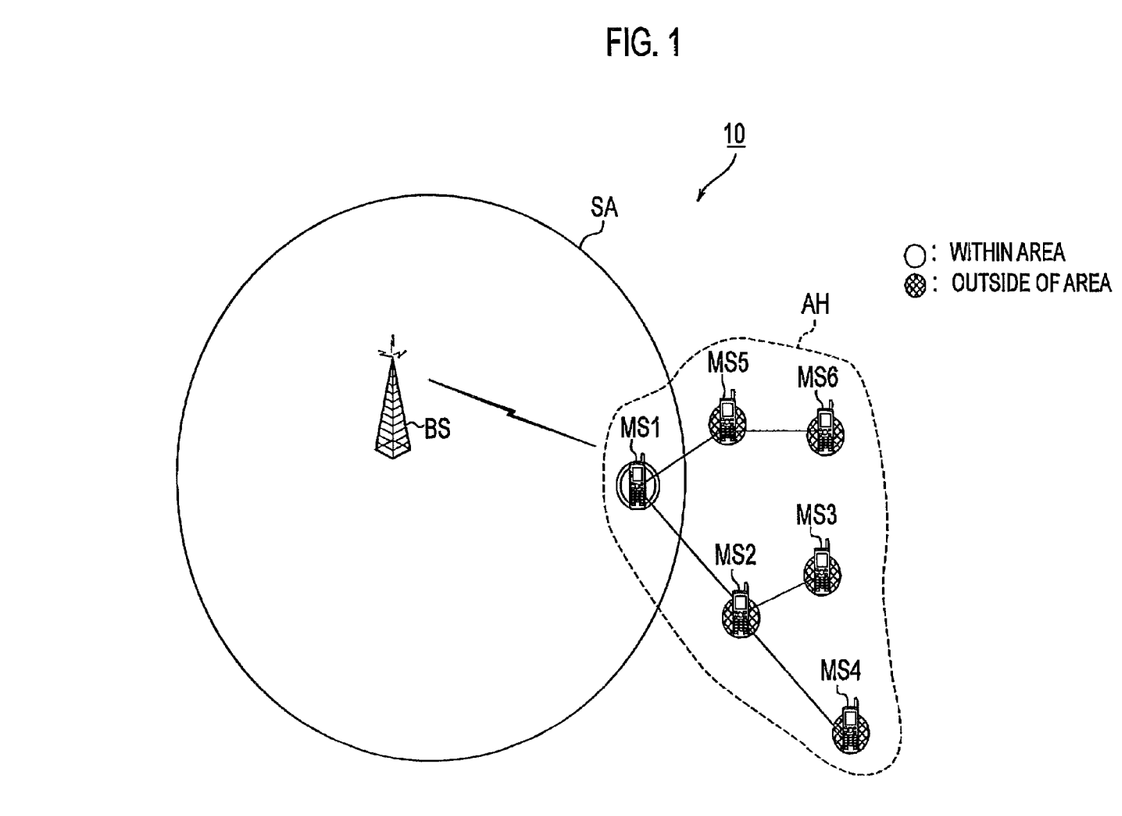
FIG. 1 is an overall schematic configuration diagram of a radio communication system according to an embodiment of the present invention.

FIG. 1 is an overall schematic configuration diagram of a radio communication system 10 according to the embodiment. As shown in FIG. 1, the radio communication system 10 has a radio base station BS and radio terminals MS1 to MS6.

The radio base station BS forms a service area (area where radio waves can reach) where direct communications with a radio terminal is possible. In an example of FIG. 1, the radio base station BS directly communicates with the radio terminal MS1 located in the service area SA.

Each of the radio terminals MS1 to MS6 is provided with a function to directly communicate with the radio base station BS (single-hop communications) and a function to communicate with the radio base station BS through at least one of other radio terminals (multi-hop communications).

In the embodiment, the radio terminals MS1 to MS6 constitute an ad-hoc network AH, which is an autonomous radio network. The ad-hoc network AH has a tree structure which has the radio terminal MS1 directly communicating with the radio base station BS at the highest hierarchical level (root node).

In the example of FIG. 1, in the tree-structured ad-hoc network AH, the radio terminal MS2 and the radio terminal MS5 which connect with the radio terminal MS1 are on the same hierarchy. The radio terminal MS3 and the radio terminal MS4 which connect with the radio terminal MS2, and the radio terminal MS6 which connects with the radio terminal MS5 are on the same hierarchy. In addition, the radio terminal MS3, the radio terminal MS4, and the radio terminal MS6 are on the lowest-level hierarchy (leaf node).

In addition, each of the radio terminals MS1 to MS6 stores a radio terminal belonging to a hierarchy immediately above the radio terminal as a master and a radio terminal belonging to a hierarchy immediately below the radio terminal as a slave. For example, the radio terminal MS2 stores the radio terminal MS1 as a master, and the radio terminal MS3 and the radio terminal MS4 as slaves. In FIG. 1, a master of the radio terminal MS1 is the radio base station BS.

As the radio terminals MS1 to MS6 have a similar configuration, the respective radio terminals will be is collectively referred to as the radio terminal MS in the following description, as appropriate.

(2) Overall Schematic Operation of Radio Communication System

Next, the overall schematic operation of the radio communication system 10 will be described with reference to FIG. 2.

Figure 2A:
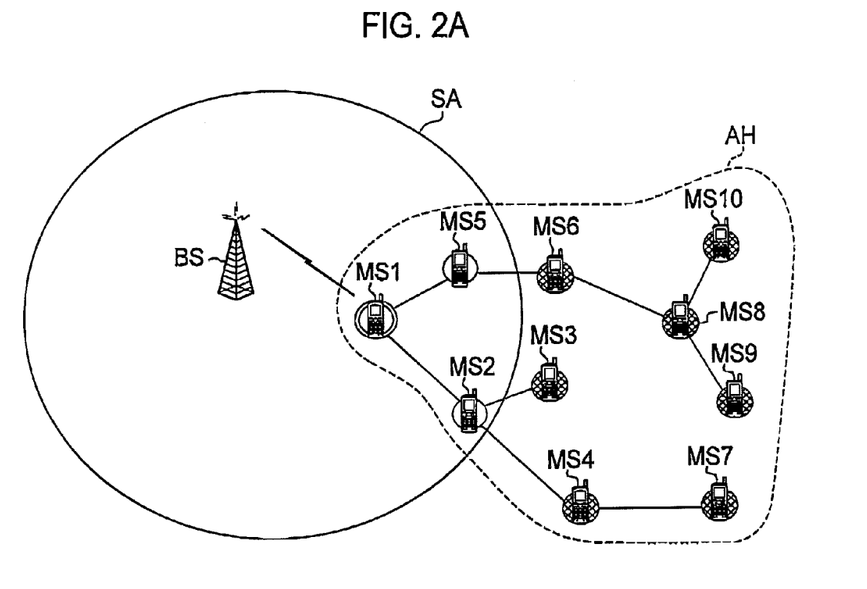
FIG. 2 is a diagram provided for describing overall schematic operation of the radio communication system according to the embodiment of the present invention.

In FIG. 2 (a), the radio terminal MS2 and the radio terminal MS5 have moved into the service area SA from the outside of the service area SA. When joining the ad-hoc network AH, the radio terminal MS2 and the radio terminal MS5 stop scanning radio waves from the radio base station BS to save electric power.

Furthermore, in FIG. 2 (a), radio terminals MS7 to MS10 have newly joined the ad-hoc network AH shown in FIG. 1.

The radio terminal MS1 directly communicating with the radio base station BS relays data from the lower-level radio terminals MS2 to MS10 to the radio base station BS. Thus, as the number of the radio terminals MS constituting the ad-hoc network AH increases, a total amount of data to be relayed also increases. Consequently, a situation which causes congestion in a communication bandwidth assigned to the communication between the radio base station BS and the radio terminal MS1 occurs.

Thus, in the embodiment, the radio terminal MS1 determines whether or not a total amount of data to be transmitted in the communications between the ad-hoc network AH and the radio base station BS exceeds a transmissible data amount (hereinafter referred to as "bandwidth allowable amount") in the communication bandwidth assigned to the communications between the radio terminal MS1 and the radio base station BS.

If the total amount of data to be transmitted exceeds the bandwidth allowable amount, the radio terminal MS1 instructs a slave (the radio terminal MS2, for example) to search radio waves from the radio base station BS.

Figure 2B:
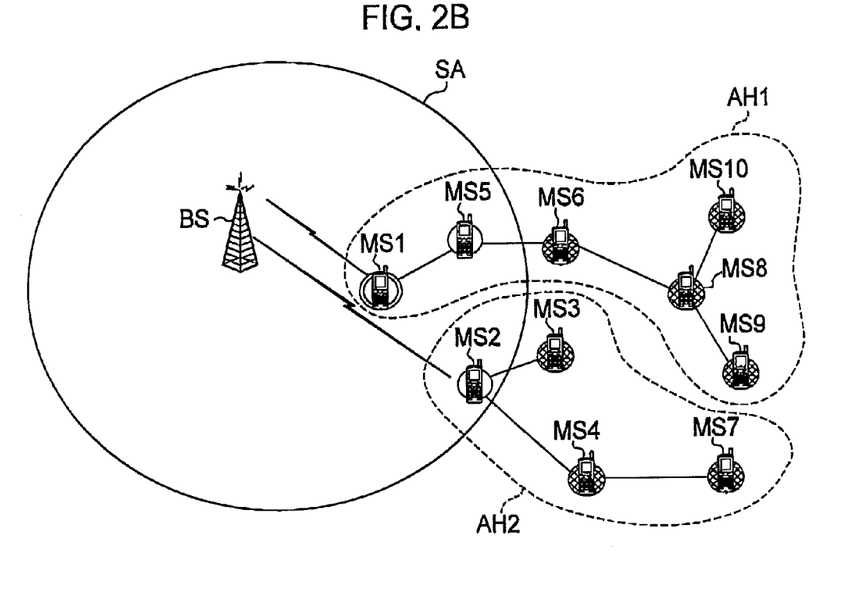

FIG. 2 (b) shows a case in which the radio terminal MS2 successfully searched radio waves. When the radio terminal MS2 succeeds in the radio wave search and then connects to the radio base station BS, a master-slave relation between the radio terminal MS1 and the radio terminal MS2 is cancelled. That is to say, the radio terminal MS2 terminates connection with the radio terminal MS1.

As a result, the ad-hoc network AH shown in FIG. 2 (a) is divided into an ad-hoc network AH1 and an ad-hoc network AH2 shown in FIG. 2 (b). With this, since traffic shouldered by the one radio terminal MS1 is distributed to the two radio terminals MS1 and MS2, occurrence of congestion can be avoided.

In addition, even when the number of the radio terminals MS in the ad-hoc network AH is not increased, congestion occurs in the following case. To be specific, in order to control communication traffic of the radio terminals MS located in the service area SA, the radio base station BS may transmit a control message for controlling a communication rate to the radio terminals MS.

Examples of such control messages for controlling the communication rate include BroadcastReverseRateLimit Message, UnicastReverseRateLimit Message specified in 1×EV-DO (C.S0024) system, or the like. Even if a communication bandwidth in the communications between the radio base station BS and the radio terminal MS1 narrows due to the control message for limiting the communication rate, occurrence of congestion can be prevented by dividing the ad-hoc network AH as described above.

(3) Configuration of Radio Terminal

Next, a configuration of the radio terminal MS will be described with reference to FIG. 3 to FIG. 5. To be specific, descriptions will be given of (3.1) Hardware Configuration of Radio Terminal, (3.2) Functional Block Configuration of Radio Terminal, and (3.3) Function of Data Amount Determination Unit.

(3.1) Hardware Configuration of Radio Terminal

Figure 3:
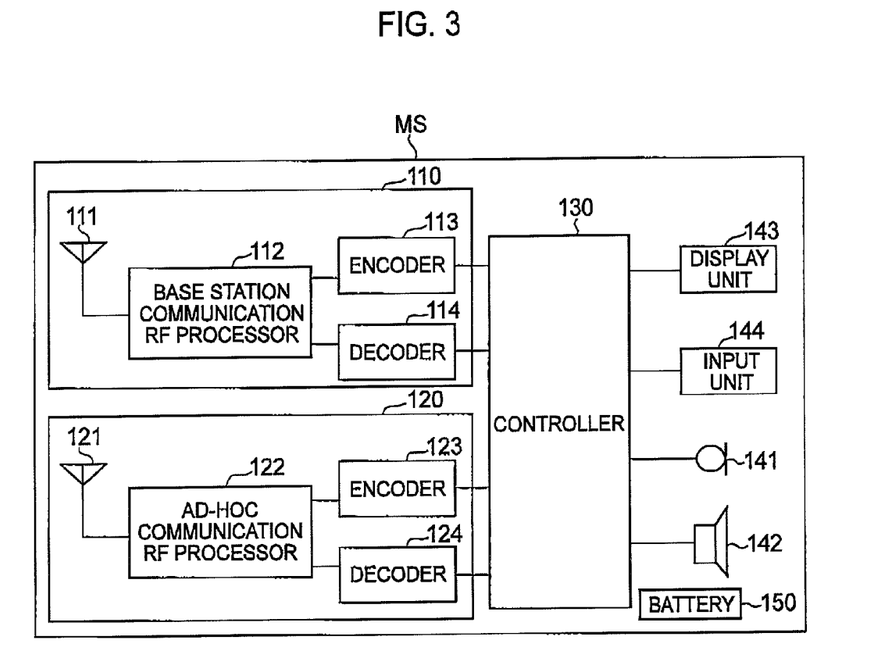
FIG. 3 is a hardware configuration diagram of a radio terminal according to the embodiment of the present invention.

FIG. 3 is a hardware configuration diagram of the radio terminal MS. As shown in FIG. 3, the radio terminal MS has a base station communication unit 110, an ad-hoc communication unit 120, a controller 130, a display unit 143, an input unit 144, a microphone 141, a speaker 142, and a battery 150.

The base station communication unit 110 connects to a radio base station BS and performs direct communications with the radio base station BS. The base station communication unit 110 transmits/receives a radio signal (RF signal) according to the CDMA method, for example, to/from the radio base station BS. The base station communication unit 110 also performs conversion between the radio signal and a baseband signal and transmits/receives the baseband signal to/from the controller 130.

The ad-hoc communication unit 120 connects to a radio terminal constituting the ad-hoc network AH, and communicates with the radio base station BS through the radio terminal. The ad-hoc communication unit 120 has a configuration conforming to Wireless LAN (IEEE802.11 or the like) or Bluetooth (registered trademark), for example. The ad-hoc communication unit 120 performs conversion between the radio signal and the baseband signal and transmits/receives the baseband signal to/from the controller 130.

The display unit 143 displays images received through the controller 130 or operation content (an inputted telephone number or an address, or the like). The input unit 144 is configured of ten keys or function keys and used to input operation content of the user.

The microphone 141 converts speech into an electric signal and inputs the electric signal to the controller 130. The speaker 142 converts the electrical signal from the controller 130 into speech, and outputs the speech.

The controller 130 configured of a CPU, a memory and the like and controls various functions the radio terminal MS is provided with. The memory stores various types of information to be used in control or the like in the radio terminal MS. The battery 150 accumulates electric power for operating the radio terminal MS and supplies the accumulated power to each block.

The base station communication unit 110 includes an antenna 111, a base station communication RF processor 112, an encoder 113, and a decoder 114.

The encoder 113 encodes the baseband signal from the controller 130. The base station communication RF processor 112 performs up-conversion and amplification of the encoded baseband signal. This generates a radio signal. The generated radio signal is sent out to the outside by way of the antenna 111.

The base station communication RF processor 112 also performs amplification and down-conversion of a radio signal received by way of the antenna 111 and generates a baseband signal. The decoder 114 decodes the generated baseband signal and inputs the decoded baseband signal to the controller 130.

The ad-hoc communication unit 120 includes an antenna 121, an ad-hoc communication RF processor 122, an encoder 123, and a decoder 124. Since the antenna 121, the ad-hoc communication RF processor 122, the encoder 123, and the decoder 124 are similar to the antenna 111, the base station communication RF processor 112, the encoder 113, and the decoder 114, an overlapping description will be omitted.

(3.2) Functional Block Configuration of Radio Terminal

Figure 4:
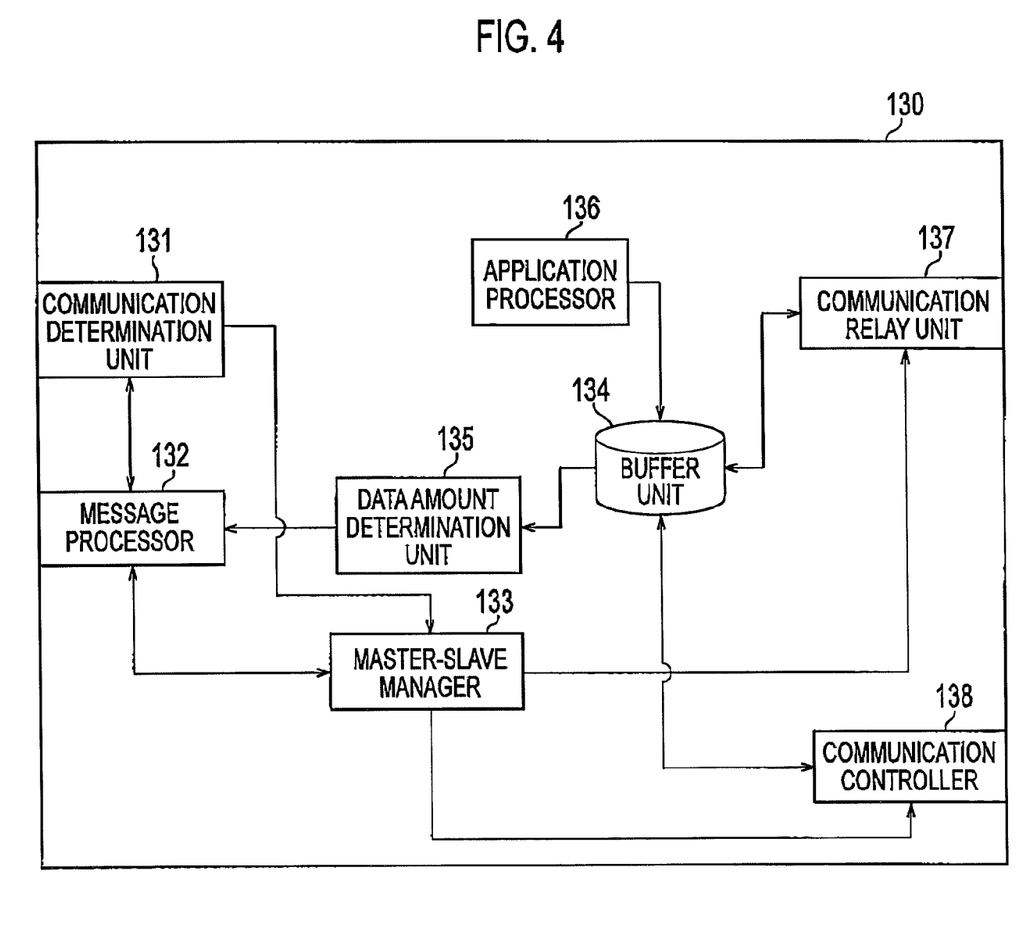
FIG. 4 is a functional block configuration diagram of the radio terminal according to the embodiment of the present invention.

FIG. 4 is a functional block configuration diagram of a radio terminal MS, i.e., a block diagram illustrating the respective functions to be performed by the controller 130. In the following, some point related to the present invention will be described.

As shown in FIG. 4, the controller 130 has a communication determination unit 131, a message processor 132, a master-slave manager 133, a buffer unit 134, a data amount determination unit 135, an application processor 136, a communication relay unit 137, and a communication controller 138.

The communication determination unit 131 performs a base station search when the ad-hoc communication unit 120 and the message processor 132 receive a search instruction of a radio base station BS from a master.

The message processor 132 mainly transmits/receives the following messages to/from the master or a slave: a search instruction (inquiry message) to instruct to perform a base station search; a search result (response massage) which is the result of the base station search; and a connection instruction (instruction message) to instruct to directly communicate with the radio base station.

The master-slave manager 133 stores/manages identification information for identifying a master and identification information for identifying a slave. As the identification information, a terminal ID or an address (IP address or MAC address) can be used.

The application processor 136 processes VoIP (Voice over Internet Protocol) application, for example, and generates application data. The generated application data is held in the buffer unit 134.

The buffer unit 134 has transmission buffer and reception buffer. The transmission buffer of the buffer unit 134 holds relay data to be relayed from a slave to a master by the communication relay unit 137 and application data generated by the application processor 136, till transmission to the master completes.

The reception buffer of the buffer unit 134 holds relay data to be relayed from the master to the slave by the communication relay unit 137 and the application data (received data) to be processed by the application processor 136.

When the radio terminal MS directly communicates with the radio base station BS, the data amount determination unit 135 determines whether or not a total amount of data to be transmitted to the radio base station BS exceeds a bandwidth allowable amount, on the basis of a data amount held in the transmission buffer of the buffer unit 134.

If whether or not the total data amount to be transmitted to the radio base station BS exceeds the bandwidth allowable amount is determined, the message processor 132 transmits a search instruction to the slave.

The communication relay unit 37 relays communications between the slave and the master. That is to say, the communication relay unit 137 relays data (packets) to be transmitted/received between the slave and the master, on the basis of the identification information managed by the master-slave manager 133.

The communication controller 138 controls the base station communication unit 110 and the ad-hoc communication unit 120. When the master-slave manager 133 registers the master, the communication controller 138 causes the base station communication unit 110 to stop receiving a radio signal (a broadcast signal such as a pilot signal, for example) to be transmitted by the radio base station BS.

In addition, upon receipt of a communication rate limiting message from the radio base station BS, the communication controller 138 performs data communications within a range which does not exceed the communication rate specified by the message.

(3.3) Function of Data Amount Determination Unit

Next, functions of the data amount determination unit 135 will be described in detail with reference to FIG. 5. Here, a case in which the radio terminal MS directly communicates with the radio base station BS will be described.

As described above, the transmission buffer of the buffer unit 134 temporarily holds the application data or the relay data to be transmitted to the radio base station BS. The communication controller 138 and the base station communication unit 110 transmit data held in the transmission buffer of the buffer unit 134 to the radio base station BS at regular intervals.

Figure 5A:
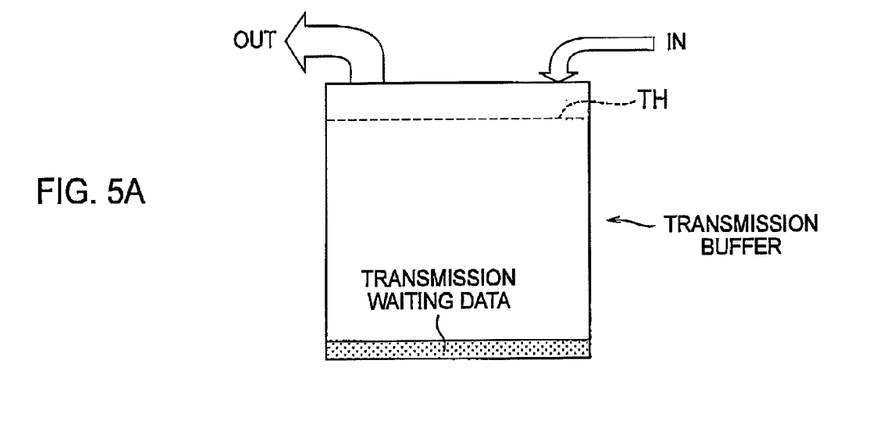
FIG. 5 is a diagram provided for describing in detail a function of a data amount determination unit of the radio terminal according to the embodiment of the present invention.

As shown in FIG. 5(a), when data IN to be stored in the transmission buffer of the buffer unit 134 is smaller than data OUT to be read out from the transmission buffer, almost no data is accumulated in the transmission buffer.

Figure 5B:
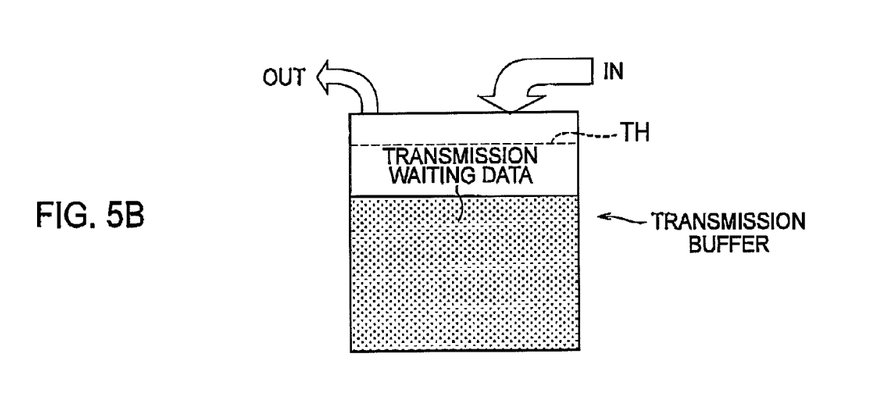

However, as shown in FIG. 5 (b) when the data IN to be stored in the transmission buffer of the buffer unit 134 is greater than the data OUT to be read out from the transmission buffer, data in the transmission buffer increases.

When the data in the transmission buffer exceeds a data amount threshold TH, flow control operates. The data amount determination unit 135 detects such a start of the flow control.

(4) Detailed Operation of Radio Communication System

Next, the operation of the radio communication system 10 will be described with reference to FIG. 6 to FIG. 8. To be specific, descriptions will be given of (4.1) Operation to Construct Ad-hoc Network, (4.2) Example 1 of Operation to Divide Ad-hoc Network, and (4.3) Example 2 of Operation to Divide Ad-hoc Network.

(4.1) Operation to Construct Ad-hoc Network

Figure 6:
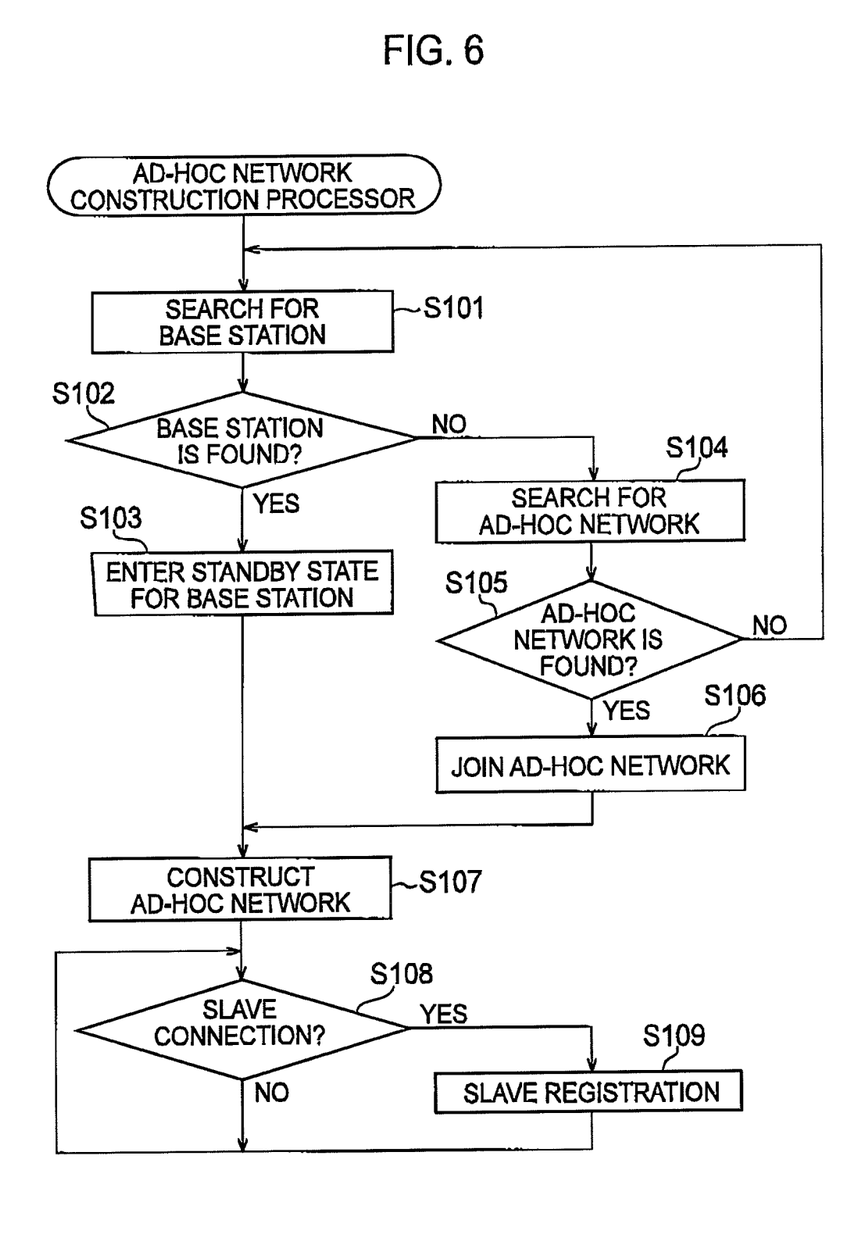
FIG. 6 is a flowchart showing ad-hoc network construction operation to be performed by the radio terminal according to the embodiment of the present invention.

FIG. 6 is a flow chart showing the operation to construct an ad-hoc network AH to be performed by a radio terminal MS.

In step S101, the radio terminal MS performs a base station search to find a radio base station BS with which direct is communications are possible. When reception level of radio signals received from a radio base station BS is stable and when the reception level is higher than a certain level, the radio terminal MS determines that direct communications with the radio base station are possible.

In step S102, the radio terminal MS determines whether or not the radio base station with which direct communications are possible is found. If the radio terminal MS finds the radio base station with which direct communications are possible, the radio terminal MS enters standby state in step S103. When entering standby state, the radio terminal MS becomes a master in itself and constructs an ad-hoc network AH.

On the one hand, if the radio terminal MS does not find any radio base station BS with which direct communications are possible, the radio terminal MS searches an ad-hoc network AH in step S104. For example, the radio terminal MS broadcasts a connection request signal within a certain range, and determines whether or not any other radio terminal MS in the ad-hoc network AH responds.

In step S105, the radio terminal MS determines whether or not the ad-hoc network AH is found.

When findings the ad-hoc network AH, in step S106, the radio terminal MS joins the found ad-hoc network AH. When joining the ad-hoc network AH, the radio terminal MS stops capturing radio waves from the radio base station to save electric power. On the other hand, if the radio terminal MS does not find the ad-hoc network AH, the process returns to step S101.

In step S107, the radio terminal MS constructs the ad-hoc network AH. To be specific, if the radio terminal MS connects to a radio base station BS, the radio terminal MS registers the radio base station BS as a master. In addition, if the radio terminal MS connects to any other radio terminal MS, the radio terminal MS registers the radio terminal MS as a master.

In step S108, the radio terminal MS determines whether or not a connection request from other radio terminal MS is received. Upon receipt of the connection request from other radio terminal MS, the radio terminal MS registers the other radio terminal MS as a slave in step S109.

(4.2) Example 1 of Operation to Divide Ad-hoc Network

Figure 7:
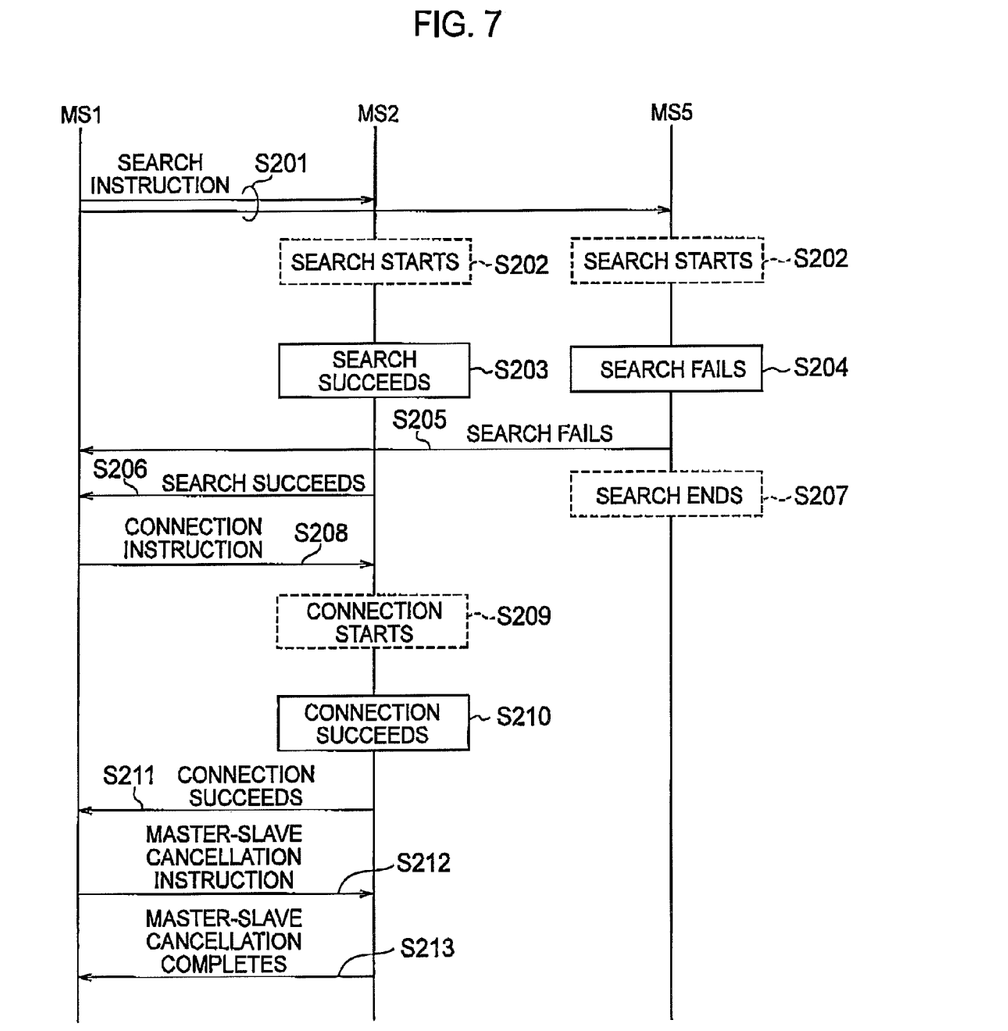
FIG. 7 is a sequence diagram showing an example 1 of ad-hoc network division operation to be performed by the radio terminal according to the embodiment of the present invention.

FIG. 7 is a sequence diagram showing an example 1 of the operation to divide an ad-hoc network AH. Here, the operation after the radio terminal MS1 transmits a search instruction to the lower-level radio terminal MS2 and radio terminal MS5 in the situation shown in FIG. 2 (a) will be described.

In step S201, the radio terminal MS1 transmits a search instruction to slaves (that is, the radio terminal MS2 and the radio terminal MS5).

Upon receipt of the search instruction, the radio terminal MS2 and the radio terminal MS5 start a base station search in step S202.

In step S203, the radio terminal MS2 succeeds in the base station search. On the one hand, in step S204, the radio terminal MS5 fails in the base station search.

In step S205, the radio terminal MS5 reports to the radio terminal MS1 the search result that radio terminal MS5 has failed in the base station search. In step S206, the radio terminal MS2 reports to the radio terminal MS1 the search result that the radio terminal MS2 has succeeded in the base station search.

In step S207, the radio terminal MS5 ends the base station search. Here, the radio terminal MS5 which failed in the base station search may transmit a search instruction to the slave (radio terminal MS6).

In step S208, the radio terminal MS1 transmits to the radio terminal MS2 a connection instruction to instruct the radio terminal MS2 to connect to the radio base station BS. Upon receipt of the connection instruction, the radio terminal MS2 starts to connect to the radio base station BS in step S209.

When successfully connecting to the radio base station BS, in step S211, the radio terminal MS2 transmits to the radio terminal MS1 a report that the radio terminal MS2 has completed to the connection to the radio base station.

In step S212, the radio terminal MS1 transmits to the radio terminal MS2 a master-slave cancelation instruction to instruct the radio terminal MS2 to cancel the master-slave relation. In addition, in step S212, the radio terminal MS1 cancels the registration of the radio terminal MS2 as a slave.

In step S213, the radio terminal MS2 not only cancels the master registration of the radio terminal MS1 but also reports to the radio terminal MS1 accordingly. Then, the radio terminal MS2 terminates the connection with the radio terminal MS1. With this, the radio terminal MS2 constructs a new ad-hoc network.

(4.3) Example 2 of Operation to Divide Ad-hoc Network

Figure 8:
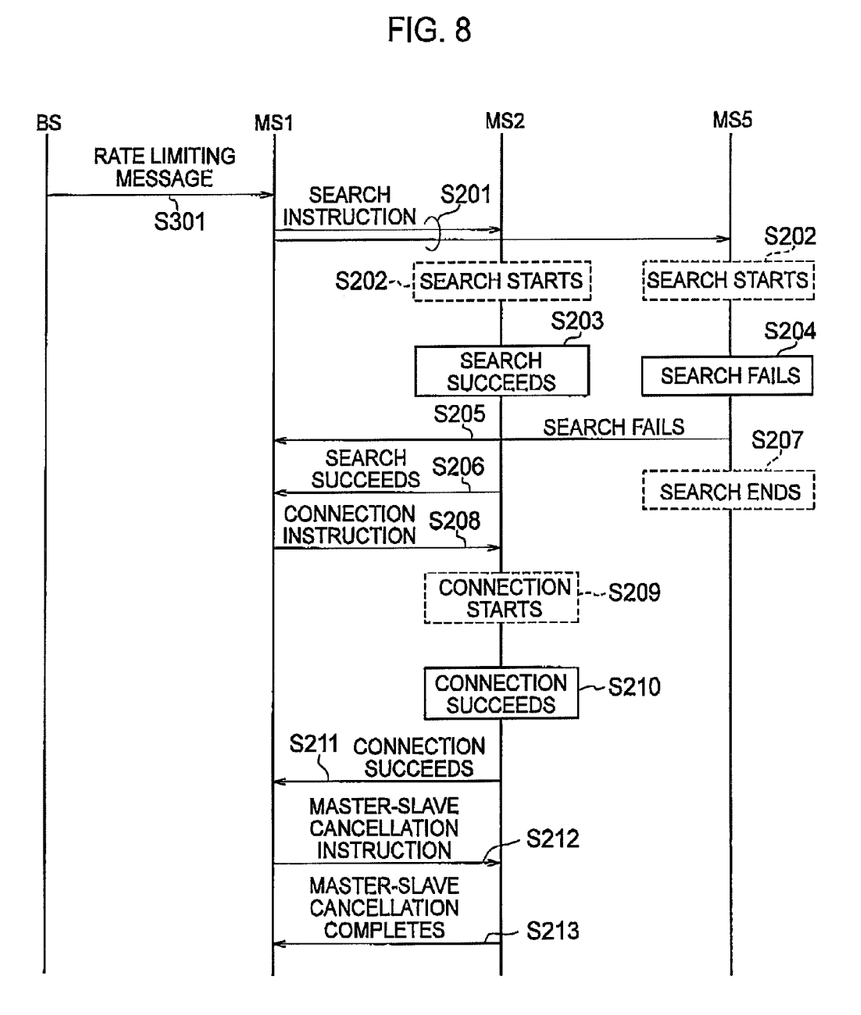
FIG. 8 is a sequence diagram showing an example 2 of the ad-hoc network division operation performed by the radio terminal according to the embodiment of the present invention.

FIG. 8 is a sequence diagram showing an example 2 of the operation to divide an ad-hoc network AH. Here, the operation for the radio terminal MS1 to receive a communication rate limiting message from the radio base station BS will be described. In addition, only differences from FIG. 7 will be described.

In step S301, the radio base station BS transmits a communication rate limiting message to the radio terminal MS1. As a result, even if the number of the radio terminals MS constituting the ad-hoc network AH does not change, the data amount in the transmission buffer shown in FIG. 5 reaches the data amount threshold TH.

Therefore, in step S201, the radio terminal MS1 transmits a search instruction to slaves (the radio terminal MS2 and the radio terminal MS5). The subsequent operation is similar to FIG. 7.

(5) Operation and Effect

According to the embodiment, a radio terminal MS directly communicating with a radio base station BS transmits a search instruction to slaves when a total amount of data to be transmitted in the communications between all radio terminals MS constituting an ad-hoc network and the radio base station BS exceeds a transmissible data amount in a communication bandwidth assigned to the communications between the base station communication unit 110 and the radio base station BS.

When receiving the search instruction from a master, the radio terminal MS determines whether or not direct communications with the radio base station are possible. Then, when determining that direct communications with the radio base station are possible, the radio terminal MS not only performs direct communications with the radio base station BS but also terminates connection with the master.

Therefore, even when the number of the radio terminals MS increases or the communication bandwidth assigned to the communications between the root radio terminal MS and the radio base station BS narrows in the ad-hoc network AH, it is possible to prevent occurrence of delay or destruction of transmission data.

According to the embodiment, when receiving from a slave search result that direct communications with the radio base station BS are possible, the radio terminal MS transmits to the slave a connection instruction to instruct the slave to start direct communications with the radio base station BS. That is to say, by instructing the slave that can directly communicate with the radio base station BS to connect to the radio base station BS, the radio terminals MS constituting the ad-hoc network can continue communications.

According to the embodiment, the radio terminal MS determines that the total amount of data to be transmitted to the radio base station exceeds the transmissible data amount when the data amount in the transmission buffer of the buffer unit 134, which holds the relay data and the application data, exceeds the data amount threshold TH.

Therefore, it is made possible to detect with accuracy that the total amount of data to be transmitted to the radio base station BS exceeds the transmissible data amount.

According to the embodiment, when the radio terminal MS determines that direct communications with the radio base station BS are possible, the radio terminal MS transmits to the master the search result that direct communications with the radio base station are possible. The radio terminal MS also receives from the master a connection instruction to instruct the radio terminal MS to start direct communications with the radio base station. Then, when direct communications with the radio base station are possible and when the radio terminal MS receives the connection instruction, the radio terminal MS performs direct communications with the radio base station BS. Thus, by waiting for the connection instruction and then performing the master-slave exchange, the radio terminal MS can perform the master-slave exchange more reliably.

According to the embodiment, when the radio terminal MS determines, after receiving the search instruction, that direct communications with the radio base station BS are not possible, the radio terminal MS transmits a search instruction to the slave. Therefore, the search instruction can be propagated to the radio terminals MS in the respective lower-level hierarchies.

(6) Other Embodiments

Although the present invention has been described through the embodiment as described above, it should not be construed that the descriptions and drawings constituting a part of this disclosure will limit the present invention. Various alternative embodiments, examples, and operation techniques will be apparent to those skilled in the art from this disclosure.

In the embodiment described above, the data amount determination unit 135 determines that the total amount of data to be transmitted from the ad-hoc network AH to the radio base station BS exceeds the bandwidth allowable amount when the data amount held in the transmission buffer of the buffer unit 134 exceeds the data amount threshold TH. That is to say, when congestion occurs in uplink communication, the process to divide the ad-hoc network AH is performed.

However, the division process of the ad-hoc network AH is not limited to the uplink, but is also applicable to congestion in downlink communication. When the number of the radio terminals MS constituting the ad-hoc network AH increases, for example, the total amount of data to be transmitted from the radio base station to the ad-hoc network AH may exceed the bandwidth allowable amount.

In such a case, the data to be transmitted to the respective radio terminals MS constituting the ad-hoc network AH is accumulated in the transmission buffer of the radio base station BS. Therefore, when the data amount held in the transmission buffer of the radio base station BS exceeds the data amount threshold TH, the radio base station BS notifies the root radio terminal in the ad-hoc network AH accordingly.

Then, when receiving the notice, the data amount determination unit 135 of the root radio terminal MS determines that the total amount of data to be transmitted from the radio base station BS to the respective radio terminals MS constituting the ad-hoc network AH exceeds the bandwidth allowable amount. As a result, the message processor 132 of the root radio terminal MS transmits a search instruction to the slaves. With this, since downlink traffic shouldered by the one radio terminal MS is distributed to multiple radio terminals MS, congestion in the downlink communication can be prevented.

In addition, when the data amount held in the reception buffer of the root radio terminal MS exceeds the data amount threshold TH, the root radio terminal MS determines that the total amount of data to be transmitted from the radio base station BS to the respective radio terminals MS constituting the ad-hoc network AH exceeds the bandwidth allowable amount, the root radio terminal MS may transmit a search instruction to the slaves.

In the embodiment described above, although a mobile phone terminal is exemplified as the radio terminal MS, the radio terminal MS may be a notebook computer or a personal digital assistant (PDA) or the like having a radio communication function. An ad-hoc network AH including not only a portable radio terminal but also a fixed radio terminal may also be configured.

Additionally, in the operation to construct the ad-hoc network as described above, existing routing protocols such as DSR (Dynamic Source Routing) or AODV (Ad-hoc On-Demand Vector Routing) can be used.

Thus, it should be understood that the present invention includes various embodiments or the like which have not been described herein. Therefore, the present invention should be defined only by subject matters to define the invention according to the scope of claims reasonably understood from the above the disclosure.

INDUSTRIAL APPLICABILITY

As described above, because the radio terminal and the radio communication method according to the present invention can prevent occurrence of data delay or data destruction even when the number of lower-level radio terminals increases or a communication bandwidth assigned to the communications between the root radio terminal and radio base station narrows in the tree-structured network, they are useful in radio communications such as mobile communications or the like.

The invention claimed is:

1. A radio terminal in a tree-structured network, wherein the radio terminal directly communicates with a radio base station such that the radio terminal is a root of the tree-structured network, the radio terminal comprising:
   a communication unit configured to directly communicate with the radio base station;
   a communication relay unit configured to relay communications between the radio base station and a lower-level radio terminal in the tree-structure network;
   an inquiry message transmitter configured to transmit, to the lower-level radio terminal, an inquiry message for inquiring whether or not the lower-level radio terminal can directly communicate with the radio base station, in accordance with a transmissible data amount in a communication bandwidth assigned to the communications between the communication unit and the radio base station, even when the radio terminal does not receive a request for transmitting the inquiry message from the radio base station:
   a response message receiver configured to receive from the lower-level radio terminal a response message indicating that direct communications with the radio base station are possible, when the lower-level radio determines that direct communications with the radio base station are possible; and
   an instruction message transmitter configured to transmit to the lower-level radio terminal an instruction message instructing to start direct communications with the radio base station, thereby causing the lower-level radio to perform direct communications with the radio base station.

2. The radio terminal according to claim 1, further comprising a data amount determination unit configured to determine whether or not a total amount of data to be transmitted in the communications between all radio terminals in the tree-structured network and the radio base station exceeds the transmissible data mount, wherein
   the inquiry message transmitter transmits the inquiry message to the lower-level radio terminal when the data amount determination unit determines that the total data amount exceeds the transmissible data amount.

3. The radio terminal according to claim 2 further comprising an instruction message transmitter configured to transmit an instruction message to the lower-level radio terminal when a response message indicating that direct communications with the radio base station are possible is received from the lower-level radio terminal, the instruction message instructing the lower-level radio terminal to start direct communications with the radio base station.

4. The radio terminal according to claim 2, further comprising:
   a transmission data generator configured to generate transmission data to be transmitted to the radio base station; and
   a transmission buffer unit configured to hold relay data to be relayed by the communication relay unit from the lower-level radio terminal to the radio base station and the transmission data generated by the transmission data generator, until transmission to the radio base station completes,
   wherein the data amount determination unit determines that the total amount of data exceeds the transmissible data amount, when the data amount of the relay data and the transmission data held in the transmission buffer unit exceeds a predetermined threshold.

5. A lower-level radio terminal in a tree-structured network, wherein the tree-structured network comprises an upper-level radio terminal directly communicating with a radio base station such that the upper-level radio terminal is set to be a root, the lower-level radio terminal comprising:
   an inquiry message receiver configured to receive from an upper-level radio terminal in the tree-structured network an inquiry message for inquiring whether or not direct communications between the lower-level radio terminal and the radio base station are possible, wherein the inquiry message is transmitted by the upper-level radio terminal even when the upper-level radio terminal does not receive a request for transmitting the inquiry message from the radio base station;
   a communication determination unit configured to determine whether or not direct communications between the lower-level radio terminal and the radio base station are possible, when the inquiry message receiver receives the inquiry message;
   a communication unit configured to perform direct communications between the lower-level radio terminal and the radio base station, when the communication determination unit determines that direct communications with the radio base station are possible;
   a connection termination unit configured to terminate the connection with the upper-level radio terminal, when the communication determination unit determines that direct communications between the lower-level radio terminal and the radio base station are possible;

a response message transmitter configured to transmit to the upper-level radio terminal a response message indicating that direct communications with the radio base station are possible, when the communication determination unit determines that direct communications with the radio base station are possible; and an instruction message receiver configured to receive from the upper-level radio terminal an instruction message instructing to start direct communications with the radio base station, wherein the communication unit performs direct communications with the radio base station, when the communication determination unit determines that direct communications with the radio base station are possible and when the instruction message receiver receives the instruction message.

6. The radio terminal according to claim 5, further comprising an inquiry message transmitter configured to transmit the inquiry message to a lower-level radio terminal in the tree-structured network, when the communication determination unit determines that direct communications with the radio base station are not possible.

7. A radio communication method to be used in a tree-structured network, wherein an upper-level radio terminal directly communicates with a radio base station such that the upper-level radio terminal is a root of the tree-structured network, the radio communication method comprising the steps of:

directly communicating with the radio base station;

relaying communications between the radio base station and a lower-level radio terminal in the tree-structured network;

transmitting an inquiry message to the lower-level radio terminal for inquiring whether or not the lower-level radio terminal can directly communicate with the radio base station, in accordance with a transmissible data amount in a communication bandwidth assigned to the radio base station, even when the upper-level radio terminal does not receive a request for transmitting the inquiry message from the radio base station;

receiving from the lower-level radio terminal a response message indicating that direct communications with the radio base station are possible, when the lower-level radio determines that direct communications with the radio base station are possible; and transmitting to the lower-level radio terminal an instruction message instructing to start direct communications with the radio base station, thereby causing the lower-level radio to perform direct communications with the radio base station.

8. The radio terminal according to claim 7, further comprising determining whether or not a total amount of data to be transmitted in the communications between all radio terminals constituting the tree-structured network and the radio base station exceeds the transmissible data amount in a communication bandwidth assigned to the communications between the communication unit and the radio base station, and wherein transmitting the inquiry message to the lower-level radio terminal further comprises transmitting the inquiry message when it is determined in the determining step that the total amount of data exceeds the transmissible data amount.

9. A radio communication method to be used in a tree-structured network, wherein an upper level radio terminal directly communicates with a radio base station such that the upper level radio terminal is a root of the tree-structured network, the radio communication method comprising the steps of:

receiving an inquiry message from the upper-level radio terminal in the tree-structured network, the inquiry message inquiring whether or not direct communications between a lower-level radio terminal and the radio base station are possible, wherein the inquiry message is transmitted by the upper-level radio terminal even when the upper-level radio terminal does not receive a request for transmitting the inquiry message from the radio base station;

determining whether or not direct communications between the lower-level radio terminal and the radio base station are possible, when the inquiry message is received in the receiving step;

performing direct communications between the lower-level radio terminal and the radio base station when it is determined in the determining step that direct communications between the lower-level radio terminal and the radio base station are possible;

terminating the connection with the upper-level radio terminal, when it is determined in the determining step that direct communications between the lower-level radio terminal and the radio base station are possible;

transmitting to the upper-level radio terminal a response message indicating that direct communications with the radio base station are possible, when the lower-level radio terminal determines that direct communications with the radio base station are possible; and receiving from the upper-level radio terminal an instruction message instructing to start direct communications with the radio base station, wherein the lower-level radio performs direct communications with the radio base station after receiving the instruction message.

* * * * *